(12) United States Patent
Lu et al.

(10) Patent No.: US 10,310,626 B1
(45) Date of Patent: Jun. 4, 2019

(54) DETACHABLE MECHANICAL KEYBOARD

(71) Applicants: DEXIN ELECTRONIC LTD., Dongguan, Guangdong (CN); DEXIN CORPORATION, New Taipei (TW)

(72) Inventors: Ho-Lung Lu, New Taipei (TW); Ching-Tsun Hong, New Taipei (TW); Yi-Shun Chen, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 16/016,730

(22) Filed: Jun. 25, 2018

(30) Foreign Application Priority Data

Jan. 17, 2018 (TW) .............................. 107101692 A

(51) Int. Cl.
*G06F 3/02* (2006.01)
*A63F 13/24* (2014.01)

(52) U.S. Cl.
CPC ............ *G06F 3/0221* (2013.01); *A63F 13/24* (2014.09); *G06F 3/0219* (2013.01); *A63F 2300/1043* (2013.01)

(58) Field of Classification Search
CPC .... G06F 3/0221; G06F 3/0219; G06F 1/1616; G06F 3/0202; G06F 1/1666; G06F 3/0216; G06F 1/1669; H01H 2223/05; A63F 13/24; A63F 2300/1043
See application file for complete search history.

(56) References Cited

U.S. PATENT DOCUMENTS

| | | | | |
|---|---|---|---|---|
| 4,739,451 A * | 4/1988 | Kuba | ................... | G06F 3/0202 361/679.08 |
| 5,457,453 A * | 10/1995 | Chiu | ........................ | B41J 5/105 341/22 |
| 5,731,808 A * | 3/1998 | Gaither | ................ | G06F 3/0216 341/22 |
| 6,215,419 B1 * | 4/2001 | Leman | .................. | G06F 1/1615 341/20 |
| 6,256,017 B1 * | 7/2001 | Bullister | ............... | G06F 1/1616 345/168 |
| 6,266,234 B1 * | 7/2001 | Leman | .................. | G06F 1/1615 312/208.4 |
| 6,585,440 B2 * | 7/2003 | Lin | ....................... | G06F 3/0221 341/22 |

(Continued)

*Primary Examiner* — Abhishek M Rathod
(74) *Attorney, Agent, or Firm* — Li & Cai Intellectual Property (USA) Office

(57) ABSTRACT

A detachable mechanical keyboard includes a first mechanical keyboard and a second mechanical keyboard. The first mechanical keyboard has a first function key section, a first numeric key section, and a first alphabetic key section. The first mechanical keyboard has a first side, and a first connector adjacent to the first side. The second mechanical keyboard has a second function key section, a second numeric key section, and a second alphabetic key section. The second mechanical keyboard has a second side, and a second connector adjacent to the second side. The first mechanical keyboard is detachably assembled with the second mechanical keyboard to form a standard layout keyboard. When the first mechanical keyboard is detached from the second mechanical keyboard, the first mechanical keyboard can be used independently.

8 Claims, 5 Drawing Sheets

(56) References Cited

U.S. PATENT DOCUMENTS

| | | | | |
|---|---|---|---|---|
| 8,289,684 | B2* | 10/2012 | Hargreaves | G06F 3/0208 |
| | | | | 361/679.01 |
| 9,137,917 | B2* | 9/2015 | Kim | H05K 7/00 |
| 2002/0175957 | A1* | 11/2002 | Huang | G06F 3/0221 |
| | | | | 715/863 |
| 2008/0253822 | A1* | 10/2008 | Matias | G06F 3/0221 |
| | | | | 400/472 |
| 2010/0289748 | A1* | 11/2010 | Ryu | G06F 1/1616 |
| | | | | 345/169 |

* cited by examiner

DETACHABLE MECHANICAL KEYBOARD

BACKGROUND OF THE INVENTION

1. Field of the Invention

The present disclosure relates to a detachable mechanical keyboard, and in particular, to a detachable mechanical keyboard having a first mechanical keyboard and a second mechanical keyboard which are detachable, wherein the first mechanical keyboard can be used independently.

2. Description of Related Art

With the ever-improving performance of hardware for notebook computers, gamers are now provided with notebook computers that are tailored to their needs. "Electronic sports (eSports)," is a term for gaming events that have escalated to a competitive level. eSports are conducted by using electronic devices to serve as sports equipment in clash of intellect and reaction between players. In addition, with the development of eSports, relative products, such as gaming keyboards, have been developed. Gaming keyboards are usually mechanical keyboards with additional distinctive functions.

However, mechanical keyboards are generally large in size and cannot be equipped in a notebook computer, and it would be inconvenient for a gamer to carry around such a keyboard.

SUMMARY OF THE INVENTION

The present disclosure is to provide a detachable mechanical keyboard, which can be separated into a first mechanical keyboard and a second mechanical keyboard, wherein the first mechanical keyboard can be independently used with a notebook computer.

In order to solve the drawbacks associated with the related art, according to one exemplary embodiment of the present disclosure, a detachable mechanical keyboard is provided, which includes a first mechanical keyboard and a second mechanical keyboard. The first mechanical keyboard has a first function key section, a first numeric key section, and a first alphabetic key section. The first mechanical keyboard has a first side, and a first connector which is disposed on the first mechanical keyboard adjacent to the first side. The second mechanical keyboard has a second function key section, a second numeric key section, and a second alphabetic key section. The second mechanical keyboard has a second side, and a second connector which is disposed on the second mechanical keyboard. The first mechanical keyboard is detachably assembled with the second mechanical keyboard to form a standard layout keyboard. When the first mechanical keyboard is assembled with the second mechanical keyboard, the first connector is electrically connected to the second connector. When the first mechanical keyboard and the second mechanical keyboard are separated, the first mechanical keyboard can be used independently.

Accordingly, the present disclosure has advantages as follows. The first mechanical keyboard of the present disclosure is detachably assembled to the second mechanical keyboard to form a standard layout keyboard which can serve as a standard layout mechanical keyboard for common use. In addition, when the first mechanical keyboard is separated from the second mechanical keyboard, the first mechanical keyboard can be used independently. Since keys of the first mechanical keyboard are selected from common keys in eSports games, the first mechanical keyboard can be connected to a notebook computer for gaming operations. The first mechanical keyboard has an area smaller than half the area of the assembled detachable mechanical keyboard, and thus can be easily carried.

For further understanding of the present disclosure, reference is made to the following detailed description illustrating the embodiments and examples of the present disclosure. The description is for illustrative purpose only and is not intended to limit the scope of the claim.

DETAILED DESCRIPTION OF THE EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
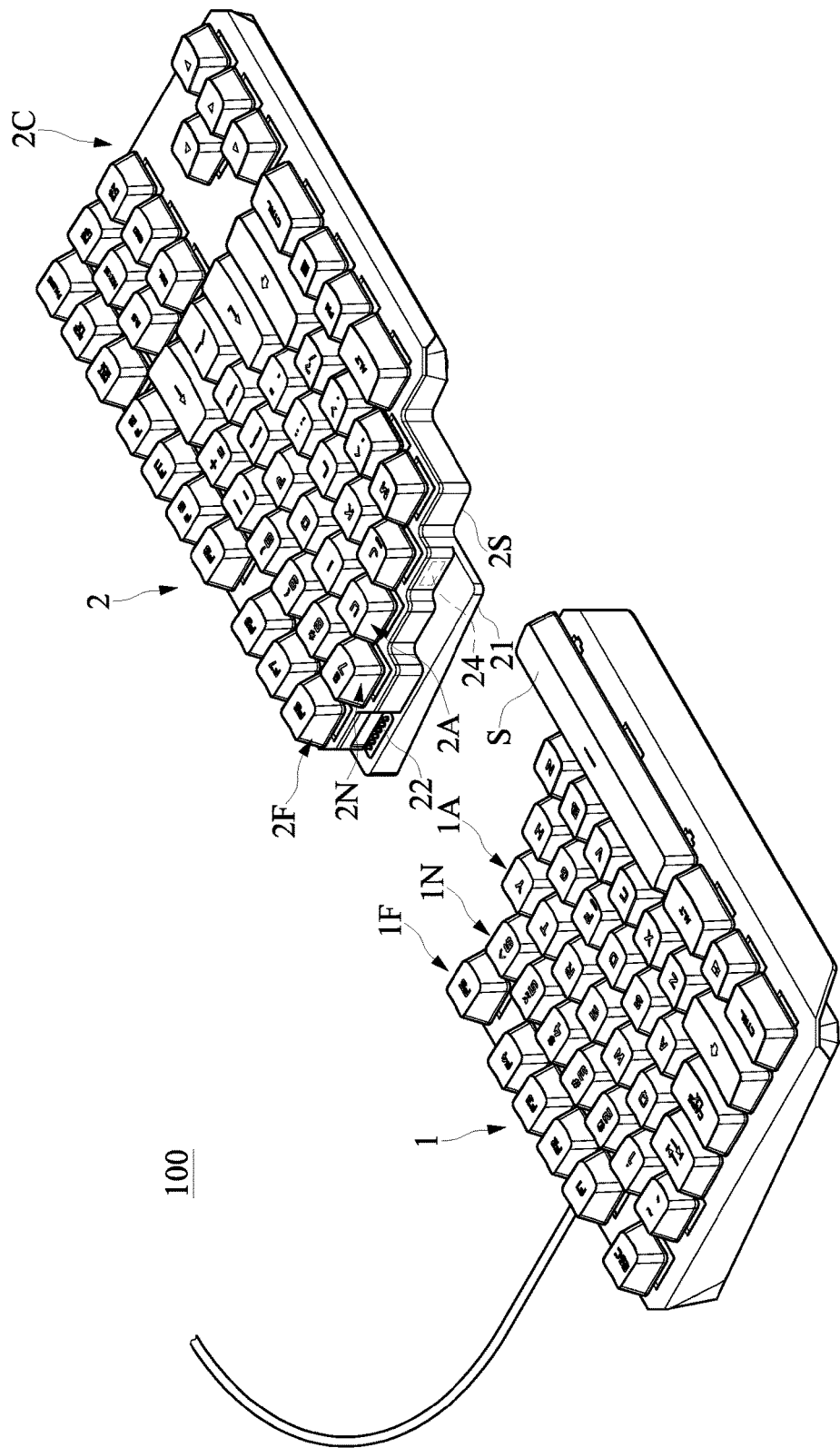
FIG. 1 is an exploded perspective view of a detachable mechanical keyboard of the present disclosure.
Figure 2:
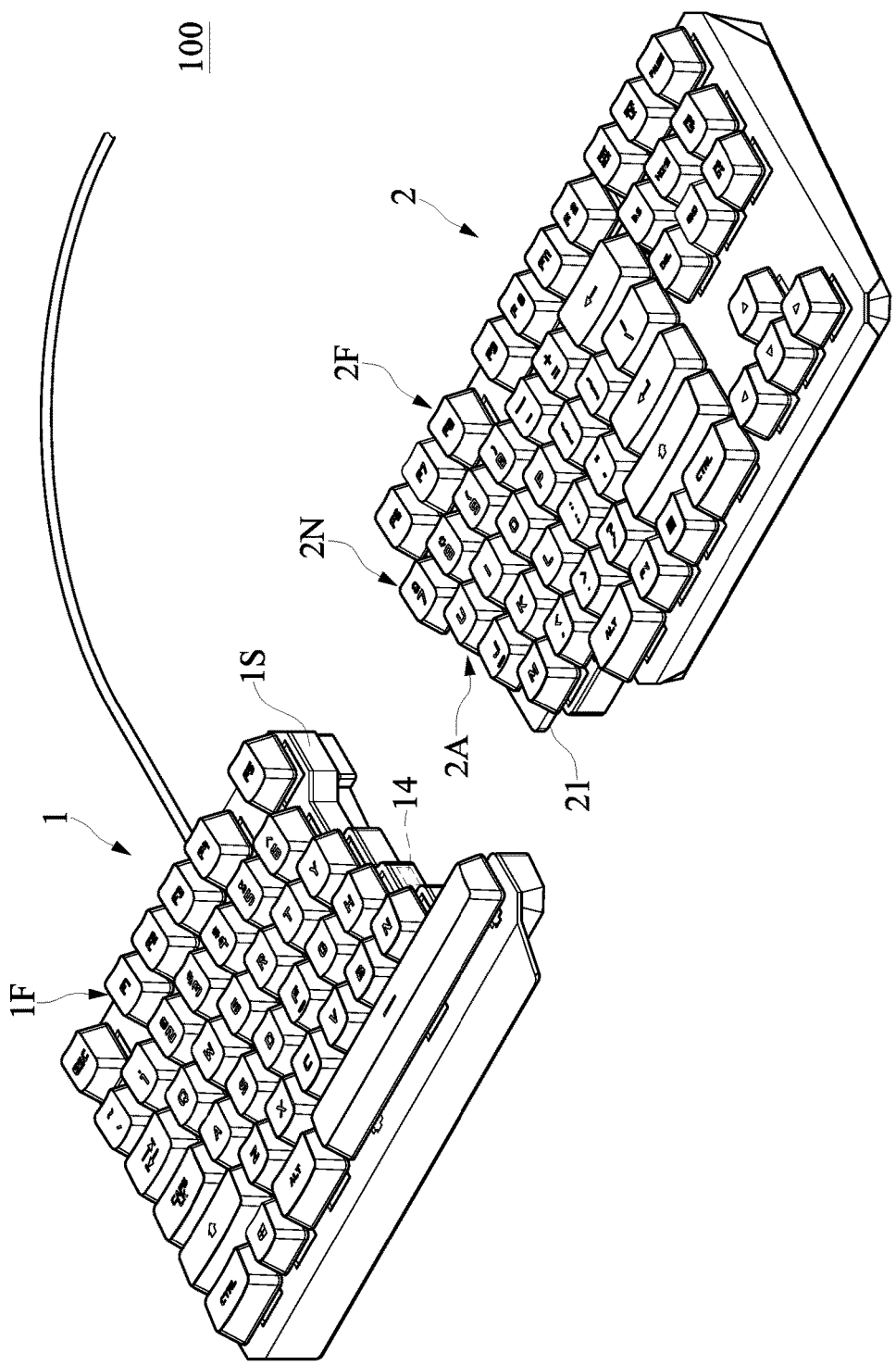
FIG. 2 is another exploded perspective view of the detachable mechanical keyboard of the present disclosure.

Reference is made to FIG. 1 and FIG. 2, the present disclosure provides a detachable mechanical keyboard 100, including a first mechanical keyboard 1 and a second mechanical keyboard 2. The first mechanical keyboard 1 is detachably assembled to the second mechanical keyboard 2 to form a standard layout keyboard, for example. The standard layout keyboard refers to a keyboard having complete standard numeric keys, alphabetic keys, cursor keys, modifier keys (such as Shift keys, Alt keys, Ctrl keys, caps lock keys, etc.) For example, in this embodiment, the standard layout keyboard has 87 keys or 104 keys according to the QWERTY-type layout. However, the present disclosure is not limited thereto. According to different languages, a layout of alphabetic keys can be arranged differently.

The first mechanical keyboard 1 has a first function key section 1F, a first numeric key section 1N, and a first alphabetic key section 1A. The first mechanical keyboard 1 has a first side 1S facing the second mechanical keyboard 2. The first mechanical keyboard 1 has a first connector 12 adjacent to the first side 1S. The first mechanical keyboard 1 further includes a space key S. In this embodiment, the keys of the first mechanical keyboard 1 are selected from common keys in eSports games, and the positions of these common keys are the same as those of the common mechanical keyboards. For example, the first mechanical keyboard 1 may have 38 keys. The first function key section 1F includes keys F1, F2, F3 to F5. The first numeric key section 1N includes keys 1, 2, 3 to 6. The first alphabetic key section 1A has three rows of alphabetic keys, and each row of the alphabetic keys has six keys, "QWERTY", "ASDFGH" and "ZXCVBN" respectively.

Figure 5:
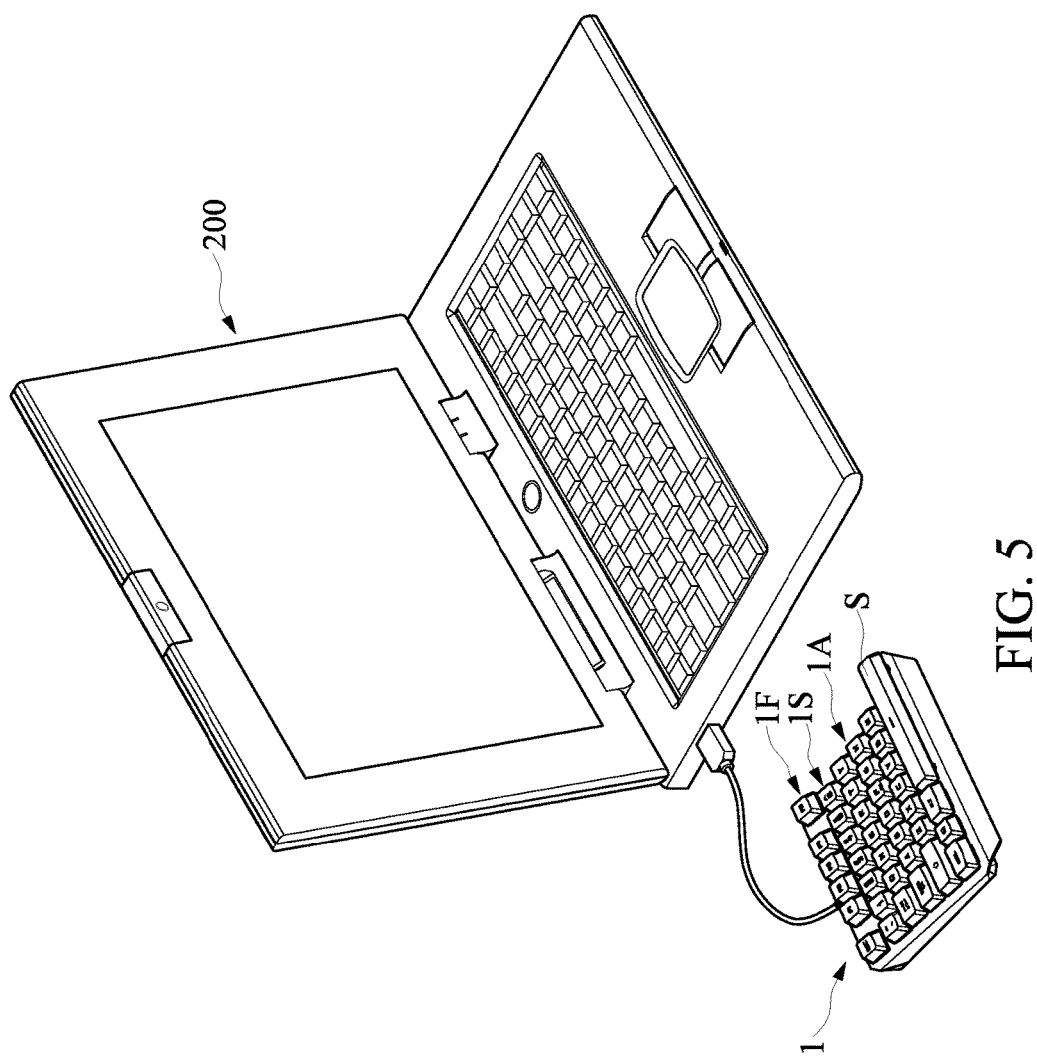
FIG. 5 is an assembled perspective view of the detachable mechanical keyboard of the present disclosure.

In practice, the first mechanical keyboard 1 of the present disclosure can be externally connected to a notebook computer 200 as shown in FIG. 5. Therefore, the first mechanical keyboard 1 can provide the notebook computer 200 with an operating performance that a mechanical keyboard of the notebook computer 200 cannot provide, and users will be able to easily carry the first mechanical keyboard 1 around, being smaller than a common standard layout keyboard, to be connected with the notebook computer 200 for gaming operations.

Reference is made to FIG. 1 and FIG. 2, the second mechanical keyboard 2 has at least one second function key section 2F, a second numeric key section 2N and a second alphabetic key section 2A. The second mechanical keyboard 2 has a second side 2S and a second connector 22. In this embodiment, the second mechanical keyboard 2 further has a cursor key section 2C. The second function key section 2F includes keys F6, F7, F8 to F12. The second numeric key section 2N includes keys 7, 8, 9 and 0. The second alphabetic key section 2A has three rows of alphabetic keys, which are UIOP, JKL and M respectively. The above-listed keys of the second mechanical keyboard 2 are merely exemplary, and other keys of the standard layout keyboard, for example, cursor keys and modifier keys (e.g., Shift keys, Alt keys, Ctrl keys, Caps Lock keys, etc.), may also be included.

An area of the first mechanical keyboard 1 in this embodiment is smaller than an area of the second mechanical keyboard 2. In other words, the area of the first mechanical keyboard 1 is smaller than half the area of the assembled standard layout keyboard, such that the first mechanical keyboard 1 is easily carried. The key number of the first alphabetic key section 1A of the first mechanical keyboard 1 is more than the key number of the second alphabetic key section 2A of the second mechanical keyboard 2. In the first alphabetic key section 1A, the number of each row of alphabetic keys is more than that of each correspondingly aligned row of the second alphabetic key section 2A.

Figure 4:
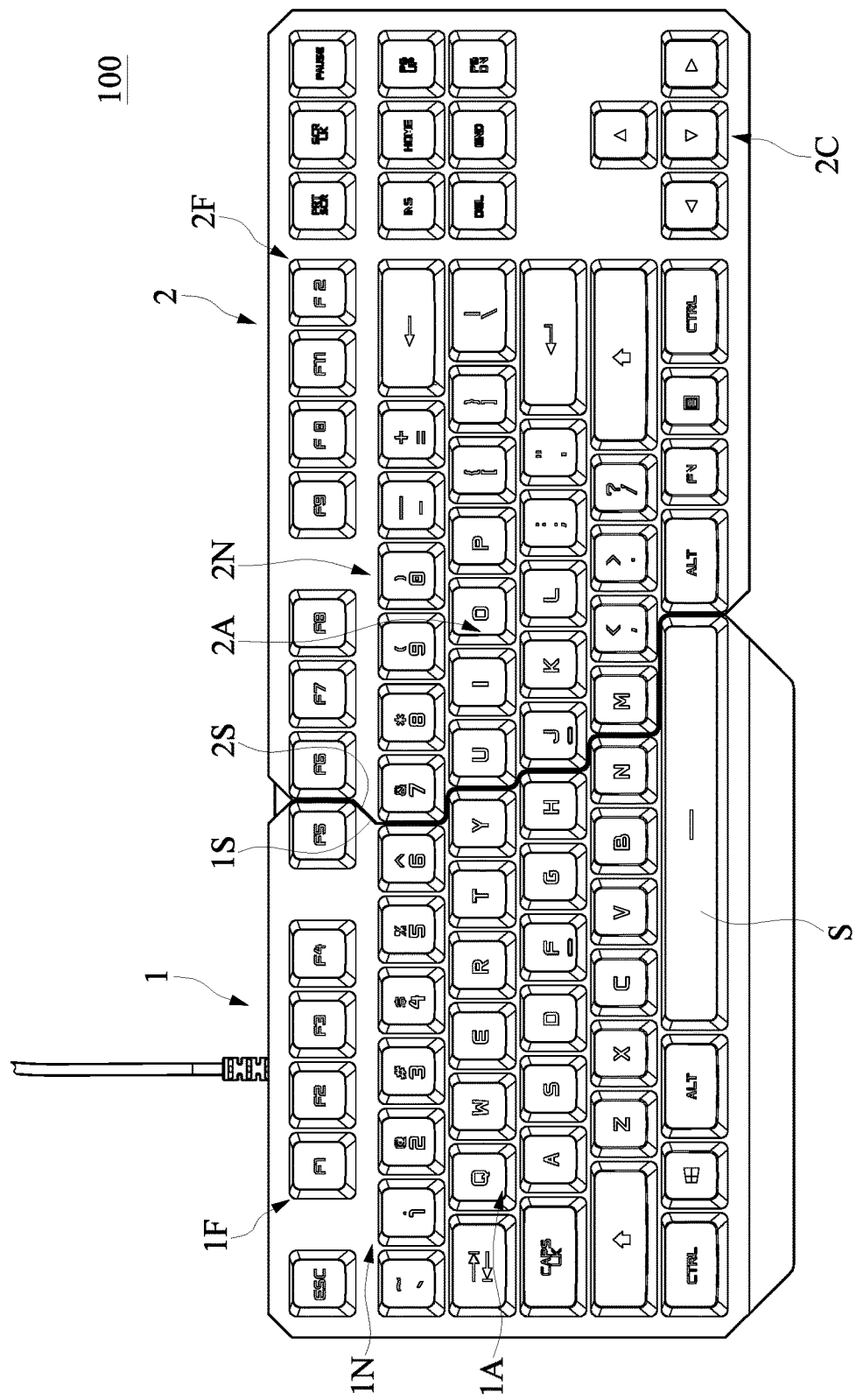
FIG. 4 is an assembled top view of the detachable mechanical keyboard of the present disclosure.

As shown in FIG. 4, the first mechanical keyboard 1 of the present disclosure is detachably assembled with the second mechanical keyboard 2 to form a standard layout keyboard. When the first mechanical keyboard 1 and the second mechanical keyboard 2 are assembled, the first connector 12 is electrically connected to the second connector 22, such that signals from the second mechanical keyboard 2 can be transmitted via the first connector 12 and the second connector 22, to the first mechanical keyboard 1 and outside. It does not increase any distance between the first mechanical keyboard 1 and the second mechanical keyboard 2, such that the operating is not effected thereto. When the first mechanical keyboard 1 and the second mechanical keyboard 2 are separated, the first mechanical keyboard 1 can be used independently.

Figure 3:
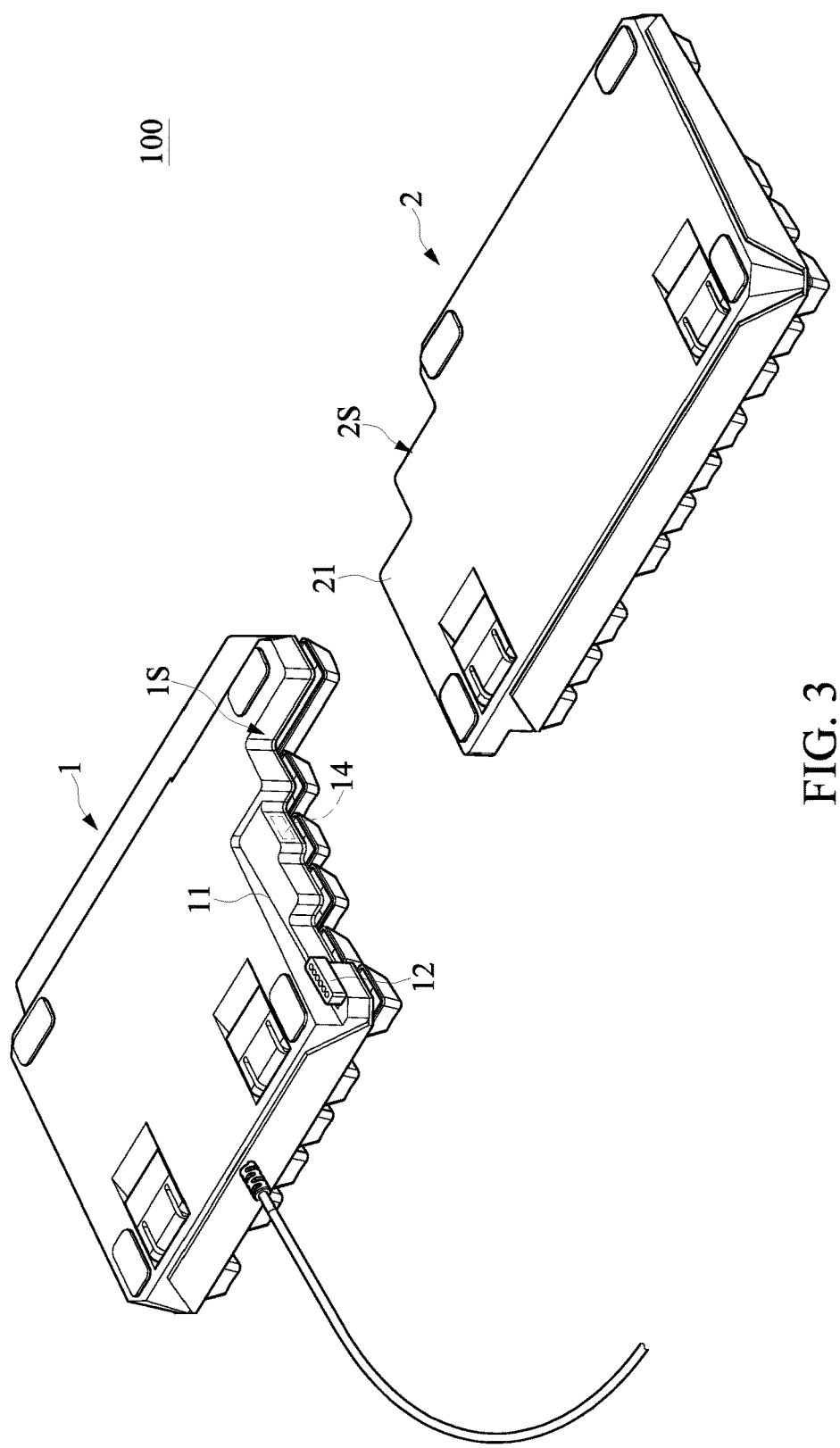
FIG. 3 is an exploded rear view of the detachable mechanical keyboard of the present disclosure.

Reference is made to FIG. 1 to FIG. 3. In this embodiment, the first side 1S of the first mechanical keyboard 1 is non-linear shaped, and the second side 2S of the second mechanical keyboard 2 is non-linear shaped. The first side 1S and the second side 2S are abutted contiguously and correspondingly. The first mechanical keyboard 1 has a first accommodating part 11 formed on a bottom thereof. The first accommodating part 11 of this embodiment is concaved inwardly from the bottom surface along the first side 1S, and the first connector 12 is disposed on the first accommodating part 11. The second mechanical keyboard 2 has a second accommodating part 21 formed on a bottom thereof. The second accommodating part 21 of this embodiment is protruded outwardly from the bottom surface along the second side 2S. The second connector 22 is disposed on the second accommodating part 21. The shape of the first accommodating part 11 is corresponded to that of the second accommodating part 21.

As shown in FIG. 2 and FIG. 3, the first connector 12 of the first mechanical keyboard 1 is adjacent to the first function key section 1F. The second connector 22 of the second mechanical keyboard 2 is adjacent to the second function key section 2F. In this embodiment, the first and second connectors 12, 22 of the detachable mechanical keyboard 100 are disposed at a position adjacent to the function key section having a greater thickness for better space utilization. In this embodiment, the first connector 12 and the second connector 22 are pogo pin connectors or spring-loaded contact connectors that include a plunger, a spring and a barrel, and that can electrically connection between two circuit boards with each other within a small space. Advantages of the spring-loaded contact connector at least include space saving, product miniaturization, being socket connector free, being water-proof, etc. However, the present disclosure is not limited thereto. Other connectors can also be used in the present disclosure, such as a leaf connector, a board-to-board connector, a Universal Serial Bus (USB), etc.

In order to reinforce the connection between the first mechanical keyboard 1 and the second mechanical keyboard 2, the first side 1S of the first mechanical keyboard 1 and the second side 2S of the second mechanical keyboard 2 respectively have at least one fixing member 14 and 24 that are fixed to each other. The fixing members 14 and 24 can be magnets, buckling elements, etc. The magnets can be embedded in the first mechanical keyboard 1 and the second mechanical keyboard 2. However, the present disclosure is not limited thereto. For example, manual locking elements can be used to lock together the first mechanical keyboard 1 and the second mechanical keyboard 2. In addition, the number of the fixing members is not limited to one pair, and can be more than one pair.

In this embodiment, the first mechanical keyboard 1 has a cable (not labeled), which can be connected to the notebook computer 200. However, the present disclosure is not limited thereto. For example, the first mechanical keyboard 1 can have two USB connectors, and one USB connector of the first mechanical keyboard 1 can be electrically connected to a USB connector of the second mechanical keyboard 2, while the other USB connector of the first mechanical keyboard 1 can be connected to the notebook computer 200 via an external USB cable or a wireless dongle.

According to the present disclosure, the features of the detachable mechanical keyboard 100 are that, the first mechanical keyboard 1 is detachably connected to the second mechanical keyboard 2 to form a standard layout keyboard, which can serve as a standard layout mechanical keyboard for common use. On the other hand, when the first mechanical keyboard 1 and the second mechanical keyboard 2 are separated, the first mechanical keyboard 1 can be used independently, specifically, to be connected to the notebook computer 200 for gaming operation in eSports since the keys of the first mechanical keyboard 1 are selected from common keys in eSports games. The area of the first mechanical keyboard 1 is smaller than half the area of the assembled standard layout keyboard, and thus the first mechanical keyboard 1 can be easily carried.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A detachable mechanical keyboard, comprising:
a first mechanical keyboard, having a first function key section, a first numeric key section and a first alphabetic key section, wherein the first mechanical keyboard has a first side, and a first connector is disposed on the first mechanical keyboard adjacent to the first side; wherein the first mechanical keyboard has a first accommodating part partially formed on a bottom thereof, the first accommodating part is partially formed on the bottom of the first mechanical keyboard in a concave manner, the first accommodating part has a bottom surface; wherein the first side of the first mechanical keyboard is nonlinear-shaped formed above the first accommodating part along an edge defined by free ends of the first function key section, the first numeric key section and the first alphabetic key section;
a second mechanical keyboard, having a second function key section, a second numeric key section and a second alphabetic key section, wherein the second mechanical keyboard has a second side, and a second connector is disposed on the second mechanical keyboard; wherein the second mechanical keyboard has a second accommodating part protruded partially from a bottom thereof, a shape of the first accommodating part corresponds to a shape of the second accommodating part, and the second accommodating part has a top surface; wherein the second side of the second mechanical keyboard is nonlinear-shaped formed above the second accommodating part along an edge defined by free ends of the second function key section, the second numeric key section and the second alphabetic key section;
wherein the first mechanical keyboard is detachably connected to the second mechanical keyboard to form a standard layout keyboard; when the first mechanical keyboard is assembled with the second mechanical keyboard, the first connector is electrically connected to the second connector; and the bottom surface of the first accommodating part attached to the top surface of the second accommodating part, so that the first function key section is adjacent to the second function key section, the first numeric key section is adjacent to the second numeric key section, and the first alphabetic key section is adjacent to the second alphabetic key section; and
when the first mechanical keyboard is separated from the second mechanical keyboard, the first mechanical keyboard is able to be used independently.

2. The detachable mechanical keyboard as claimed in claim 1, wherein keys in the first alphabetic key section of the first mechanical keyboard are selected from common keys in eSports games, and the first alphabetic key section has three rows of alphabetic keys.

3. The detachable mechanical keyboard as claimed in claim 2, wherein the standard layout keyboard has 87 keys or 104 keys according to the QWERTY-type layout, and the first mechanical keyboard further includes a space key.

4. The detachable mechanical keyboard as claimed in claim 2, wherein an area of the first mechanical keyboard is smaller than an area of the second mechanical keyboard, the number of keys in the first alphabetic key section of the first mechanical keyboard is more than the number of keys in the second alphabetic key section of the second mechanical keyboard.

5. The detachable mechanical keyboard as claimed in claim 4, wherein the first alphabetic key section is composed of three rows of alphabetic keys, and the second alphabetic key section is composed of three rows of alphabetic keys, the number of each row of the alphabetic key in the first alphabetic key section is more than the number of the alphabetic keys of each correspondingly aligned row in the second alphabetic key section.

6. The detachable mechanical keyboard as claimed in claim 5, wherein each row of the alphabetic keys in the first alphabetic key section has six keys, being "QWERTY", "ASDFGH" and "ZXCVBN" respectively.

7. The detachable mechanical keyboard as claimed in claim 1, wherein the first connector of the first mechanical keyboard is adjacent to the first function key section, and the second connector of the second mechanical keyboard is adjacent to the second function key section.

8. The detachable mechanical keyboard as claimed in claim 1, wherein the first side of the first mechanical keyboard and the second side of the second mechanical keyboard respectively have at least one fixing member that are fixed to each other.

* * * * *